United States Patent
Enevoldsen et al.

(10) Patent No.: US 9,816,807 B2
(45) Date of Patent: Nov. 14, 2017

(54) METHOD OF ANALYZING DEFORMATIONS IN A LAMINATED OBJECT AND ACCORDING SYSTEM

(71) Applicant: Vestas Wind Systems A/S, Aarhus N. (DK)

(72) Inventors: Georg Herborg Enevoldsen, Skjern (DK); Henning Schroder, Hvide Sande (DK); Kaj Morbech Halling, Herning (DK)

(73) Assignee: Vestas Wind Systems A/S, Aarhus N. (DK)

( * ) Notice: Subject to any disclaimer, the term of this patent is extended or adjusted under 35 U.S.C. 154(b) by 83 days.

(21) Appl. No.: 14/915,470

(22) PCT Filed: Aug. 27, 2014

(86) PCT No.: PCT/DK2014/050252
§ 371 (c)(1),
(2) Date: Feb. 29, 2016

(87) PCT Pub. No.: WO2015/028023
PCT Pub. Date: Mar. 5, 2015

(65) Prior Publication Data
US 2016/0209205 A1    Jul. 21, 2016

(30) Foreign Application Priority Data
Aug. 28, 2013 (DK) ............................ PA 2013 70471

(51) Int. Cl.
*G01B 11/02* (2006.01)
*G01B 11/16* (2006.01)
(Continued)

(52) U.S. Cl.
CPC ............ *G01B 11/162* (2013.01); *F03D 17/00* (2016.05); *G06T 11/206* (2013.01)

(58) Field of Classification Search
CPC ...... G01B 11/161; G01B 11/162; F03D 17/00
See application file for complete search history.

(56) References Cited

U.S. PATENT DOCUMENTS 4,913,547 A    4/1990   Moran
5,481,356 A *  1/1996   Pouet .................. G01B 11/162
                                                        356/35.5
(Continued)

FOREIGN PATENT DOCUMENTS

EP     1061332 A2    12/2000
EP     1617173 A2     1/2006
(Continued)

OTHER PUBLICATIONS

European Patent Office, International Preliminary Report on Patentability issued in International Application No. PCT/DK2014/050252 dated Nov. 26, 2015.
(Continued)

*Primary Examiner* — Michael A Lyons
(74) *Attorney, Agent, or Firm* — Wood Herron & Evans LLP (57) ABSTRACT

The present invention relates to a method of analyzing a laminated object and to a system for analyzing a laminated object. Illustrative embodiments herein relate to optical interferometry techniques for non-destructively analyzing laminated objects with large surface utilized to obtain data relating to the topography of an object under examination and to further process the obtained topographical data so as to identify type and/or severity and/or position of surface defects.

16 Claims, 7 Drawing Sheets

(51) Int. Cl.
    *G06T 11/20*     (2006.01)
    *F03D 17/00*     (2016.01)

(56)                   References Cited

U.S. PATENT DOCUMENTS

| | | | |
|---|---|---|---|
| 5,517,681 A * | 5/1996 | Talarmo | H04W 74/002 370/347 |
| 6,584,215 B1 | 6/2003 | Mahner | |
| 2003/0026457 A1 | 2/2003 | Nahum | |
| 2006/0050938 A1 | 3/2006 | Raupach | |
| 2013/0003152 A1* | 1/2013 | Belousov | G01B 11/162 359/9 |
| 2015/0338208 A1* | 11/2015 | DeWeert | G01B 11/162 356/520 |

FOREIGN PATENT DOCUMENTS

| | | | |
|---|---|---|---|
| WO | 03058163 | A1 | 7/2003 |
| WO | 2012003372 | A2 | 1/2012 |

OTHER PUBLICATIONS

Danish Patent and Trademark Office, Search Report issued in Application No. PA 2013 70471 dated Apr. 3, 2014.
European Patent Office, Search Report and Written Opinion issued in International Application No. PCT/DK2014/050252 dated Nov. 27, 2014.
European Patent Office, Written Opinion of the International Preliminary Examining Authority issued in International Application No. PCT/DK2014/050252 dated Jul. 17, 2015.

* cited by examiner

METHOD OF ANALYZING DEFORMATIONS IN A LAMINATED OBJECT AND ACCORDING SYSTEM

BACKGROUND OF THE INVENTION

1. Field of the Invention

The present invention generally relates to a method of analyzing a laminated object and a system for analyzing a laminated object. Particularly, the present invention relates to non-destructively analyzing laminated objects such as composite blades for wind turbine installations.

2. Description of the Related Art

In general, defects in material of a laminated object induce strain anomalies resulting in structural weaknesses which may negatively affect the quality of a laminated object. In particular tolerances and/or problems appearing in one or more process steps of a manufacturing processes for manufacturing laminated objects represent sources of material defects, and therefore strain anomalies, and compliance with quality standards requires examination of manufactured products in this respect to approve load capacitance with regard to future applications.

Depending on the type and size of manufactured products to be examined, various techniques are used to detect weaknesses in the employed materials. For example, measuring techniques involving ultrasound, radiometry, inductive or capacitive measuring methods and the like allow for examining the material on the presence of defects in small measuring fields. Particularly with regard to large surface laminated objects, e.g. wind turbine blades, aircraft wings etc, according techniques are time-consuming because when checking a large surface with a high degree of reliability, the entire object has to be divided into small measuring fields, where both, reliability and measuring time are directly related to the number of single measuring fields, generally resulting in long overall measuring times. On the other hand, optical inspection techniques of large surfaces allow for realizing fast measuring techniques involving interferometric measuring systems such as for example speckle interference techniques or shearography techniques.

Wind turbine blades for wind power installations are large-surface aerodynamically designed structures that are constructed primarily of fiberglass or carbon fiber reinforced composite materials. The manufacturing of these large composite structures is a difficult process that is normally performed with skilled manual labor. Particularly during the manufacturing of blades for wind turbine power installations, fabrication flaws such as delamination between layers of composite material, wrinkles or waviness between layers of composite material, lack of bond or debonds between bond lines of structural elements and leading and trailing edges of blades and wrinkled or bent fibers of fibered blade materials may appear, for instance, due to complexities in the blade manufacturing process. With their large sizes, wind turbine blades are very difficult to inspect while, on the other hand, the possible flaws or damages are very small in size in comparison with the whole blade. As many fabrication flaws are not even visible to the surface, visual examination of the surface may not be considered as providing an effective testing method for detecting fabrication flaws and assessing the quality of manufactured blades.

Document WO 2012/00337282 describes the use of a long range shearography camera for imaging deformation derivatives at great distances. A blade stressing mechanism and laser interferometry is performed in order to detect defects present in the surface of wind turbine blades.

However, known shearography methods do not allow to unambiguously detect all relevant defects because, on the one hand, washed out defects may not appear in measurements, these defects representing "false negatives". On the other hand, artifactual signals may indicate the presence of defects where no defect exists, these signals representing "false positives". In consequence, severe defects may be overseen or an examined object may be assessed as defective although no serious defect is present.

Document EP 1 061 332 A2 describes an apparatus for performing electronic shearography comprising a video camera for visualizing sequential shearogram images so as to identify defects as dynamically changing objects in an animated visualization of a sequence of shearograms.

In view of the above description it is desirable to provide a method of analyzing a laminated object and a system for analyzing a laminated object that allow to identify type, severity and position of material defects.

It is an object of the present invention to provide a method of analyzing a laminated object and to provide a system for analyzing a laminated object which overcomes the above-discussed draw-backs of the state in the art.

SUMMARY OF THE INVENTION

In one aspect, the present invention relates to a method of analyzing a laminated object. In an illustrative embodiment herein, the method comprises exposing a surface area of the laminated object to a coherent electromagnetic radiation, detecting an interference pattern induced by the coherent electromagnetic radiation reflected by the surface area, determining topographical data of the surface area based on the interference pattern, and further processing the topographical data by applying at least one of taking the absolute value of the topographical data and raising the topographical data to the power of q, wherein q is a rational number and q is greater than 1.

In further processing the topography in accordance with the above described embodiment, it is possible to more exactly localize defects as compared to using directly the topographical data itself for localizing defects, while defects may be more reliably identified and assessed with regard to their severity. In this way, false positives and false negatives as appearing in the topographical data are identifiable as such.

In a further illustrative embodiment herein, the method may further comprise determining topographical data at different load states applied to the laminated object and obtaining load data relating the further processed topographical data to the applied load. When applying different load states to the laminated object and determining topographical data in the different load states, surface defects may be more easily identified as manifested surface distortions deviating in their response upon application of different load states in comparison with surface portions not suffering from defects and deforming elastically upon loadings when evaluating load data obtained by relating the further processed topographical data to the applied load.

In a further illustrative embodiment herein, the further processing may comprise integrating the further processed topographical data at different load states along a curve on the surface area for obtaining integration data related to the applied load. In integrating data, averaged data may be obtained representing data of reduced amount.

In a further illustrative embodiment herein, the method may further comprise identifying surface defects based on comparing the load data or integration data with a data base comprising known load data or integration data assigned to known surface defects. Accordingly, surface defects may be rapidly and easily identified to a high accuracy.

In a further illustrative embodiment herein, the method may further comprise displaying at least the further process topographical data to a user. The person skilled in the art will appreciate that locating defects may be readily accomplished to a high degree of accuracy.

In a further illustrative embodiment herein, the method further comprises filtering at least the further processed topographical data in accordance with a predetermined filter. Accordingly, the risk of erroneously identifying false signals as surface defects is reduced.

In a further illustrative embodiment herein, the method may further comprise identifying a position of a surface defect based on at least the further process topographical data. The person skilled in the art will appreciate that in using at least the further processed topographical data for identifying a position of a surface defect, the defect may be accurately localized in the surface.

In a further illustrative method, the laminated object may be a wind turbine blade of a wind power installation and q may be out of a range from 1.6 to 2.5. The person skilled in the art will appreciate that surface defects of wind turbine blades may be quickly identified and characterized. In choosing q out of the range from 1.6 to 2.5, the further processed topographical data may be processed to represent the surface energy or tension of the surface such that surface defects may be easily identified as being attracted by surface distortions. In this way, anomalies in the surface energy or tension of the surface may be used for reliably identifying type and location of a surface defect.

In a further illustrative method, the further processing of the topographical data may comprise defining n regions, n>1, covering the surface area, possibly overlapping each other but not necessarily, such that the union of the regions comprises the surface area and, in each region, summing the further processed topographical data to obtain n integration values. The person skilled in the art will appreciate that summing of the further process topographical data in each region may involve weighting the process topographical data at each data point in each region by an appropriate weighting function for taking errors in the measurement into account. Therefore, a tendency of the further process topographical data at different levels of "resolution" may be obtained from the further processed topographical data.

In another aspect, the present invention relates to a system for analyzing a laminated object. In an illustrative embodiment herein, the system may comprise a source of electromagnetic radiation, a detector configured to detect electromagnetic radiation and to provide data, and a processor configured to process data provided by the detector. Herein, the processor may be configured to determine topological data based on the provided data and to further process the topographical data by application of at least one operation of taking the absolute value and raising the topographical data to the power of q, wherein q is a rational number and q>1.

The person skilled in the art will appreciate that the system according to the illustrative embodiment as described above may be advantageously applied to laminated objects of various sizes and particularly to laminated objects having large surfaces. Furthermore, the system enables a fast and reliable identification and location of surface defects in a surface of a laminated object.

In a further illustrative embodiment, the system may further comprise a memory device with a database of data for various types of surface defects, the data relating values of applied load to at least one of absolute values of topographical data and values of topographical data to the power of q. The person skilled in the art will appreciate that the data processed by the processor may be provided to the data base which may "learn" upon operation of the system.

In a further illustrative embodiment, the system may further comprise a comparator configured to compare data processed by the processor with the data of the database. The person skilled in the art will appreciate that defects may be reliably identified by the comparator based on the data base.

In a further illustrative embodiment, the memory device may comprise data indicating a severity of various kinds of surface defects associated to respective values of applied load. The person skilled in the art will appreciate that a severity of defects may be reliably identified and erroneous identification of false positives may be easily avoided.

In a further illustrative embodiment herein, the system may further comprise a shearing element configured to generate a sheared image at the detector. In this way, the system may advantageously represent a shearogaphic measuring system.

BRIEF DESCRIPTION OF THE DRAWINGS

The invention will be hereinafter described with reference to the accompanying figures, in which:

FIG. 2b schematically illustrates a fringe pattern of the defects as illustrated in FIG. 2a;

DETAILED DESCRIPTION

The present invention relates to a method of analyzing a laminated object and to a system for analyzing a laminated object. The preferred embodiments, as subsequently described, illustrate optical interferometry techniques for non-destructively analyzing laminated objects with large surfaces. Herein, various optical interferometry techniques are utilized to obtain data relating to the topography of an object under examination and, thereof, to determine topographical data of the object. The topographical data is further processed so as to identify type, severity and/or position of defects.

In accordance with an illustrative example, a shearography method may be performed for analyzing a laminated object. Herein, at least a surface portion of the laminated object is exposed to a coherent electromagnetic radiation which is in turn detected by means of an imaging device. Generally, a shearing element is disposed in the light path, either upstream or downstream the laminated object, such that two laterally-displaced images of the object interfere to form an interference pattern. In the following description of shearography methods, the laterally displaced image of the object caused by the shearing element will be referred to as a sheared image. Therefore, depending on the type of shearing element, either one or both of the images are sheared by means of the shearing element, the sheared image or images being referred to as sheared images.

Illustrative shearing elements may be given by wedge-shaped prisms, birefringent elements, such as calcide materials, for example Wallenstein prisms and the like. Alternatively, other elements, such as a defraction grating, a Michaelson mirror or an appropriate wave plate may also be applied. Imaging devices may be represented by video cameras, digital cameras, digital video cameras, charged coupled devices (CCD), photosensitive detection equipment and the like.

Upon deforming the object by temperature, pressure, or other means, the interference pattern changes and, generally, the amount of change depends on the integrity of the laminated object. In comparing the interference patterns of the laminated object in deformed and non-deformed states, information on the surface characteristic is provided allowing to assess the structural integrity of the laminated object under examination.

It is noted that in deforming the laminated object, the position of light reflecting points of the object change absolutely and relatively to each other. That is, when comparing an interference pattern in a deformed state with the interference pattern in the non-deformed state, the resulting pattern, which is frequently referred to as a "shearogram", actually provides a measure for the slope of the deformation along the shearing direction, i.e. the direction along which the images are laterally displaced by the shearing element, instead of representing the topography of the surface as obtained in other optical interference measurements.

In accordance with another illustrative embodiment of the present invention, other optical techniques, so-called out-of-plane techniques, may be applied in which coherent electromagnetic radiation is supplied to a beam-splitting element prior to illuminating at least a surface region of a laminated object. The coherent electromagnetic radiation is split by the beam-splitting element into a measurement beam and a reference beam, wherein the measurement beam is subsequently directed to the laminated object and imaged to an imaging device. The accordingly obtained image of the surface is formed by an intensity pattern of the reflected radiation wherein each point of the surface acts as a scattering centre statistically contributing to a intensity pattern in the imaging plane of the imaging device, said intensity pattern being generally referred to as speckle pattern. The reference beam also being supplied to the imaging device forms an interference pattern together with the speckle pattern in the image plane of the imaging device. The accordingly-obtained interference patterns provide a measure for movements of the surface along directions out of the imaging plane.

In another illustrative embodiments, so-called "in-plane techniques" may be performed as optically interference techniques for optically examining surfaces of laminated objects. Herein, a coherent electromagnetic radiation is supplied to at least a surface region of a laminated object which is in turn imaged into an image plane of an imaging device. The coherent electromagnetic radiation may be supplied to the laminated object from different directions, e.g. the radiation may be directed to the surface region under examination from two different directions. In some special illustrative examples herein, the radiation may be provided by means of two different sources. The radiation supplied to the surface region from different directions is reflected the surface region such that an interference pattern or image is obtained in the image plane of the imaging device. Herein, movements of the surface region of the laminated object may be detected along directions parallel to the imaging plane.

Upon comparing interference patterns or images of different load states in in-plane techniques and out-of-plane techniques, data characterizing deformations and/or the topography of an object under examination may be obtained.

With regard to FIG. 1, some special illustrative embodiments will be described in greater detail. In view of the above discussion, the person skilled in the art will appreciate that the following description is only for illustrative purposes and others of the above described techniques may be considered as well.

Figure 1:
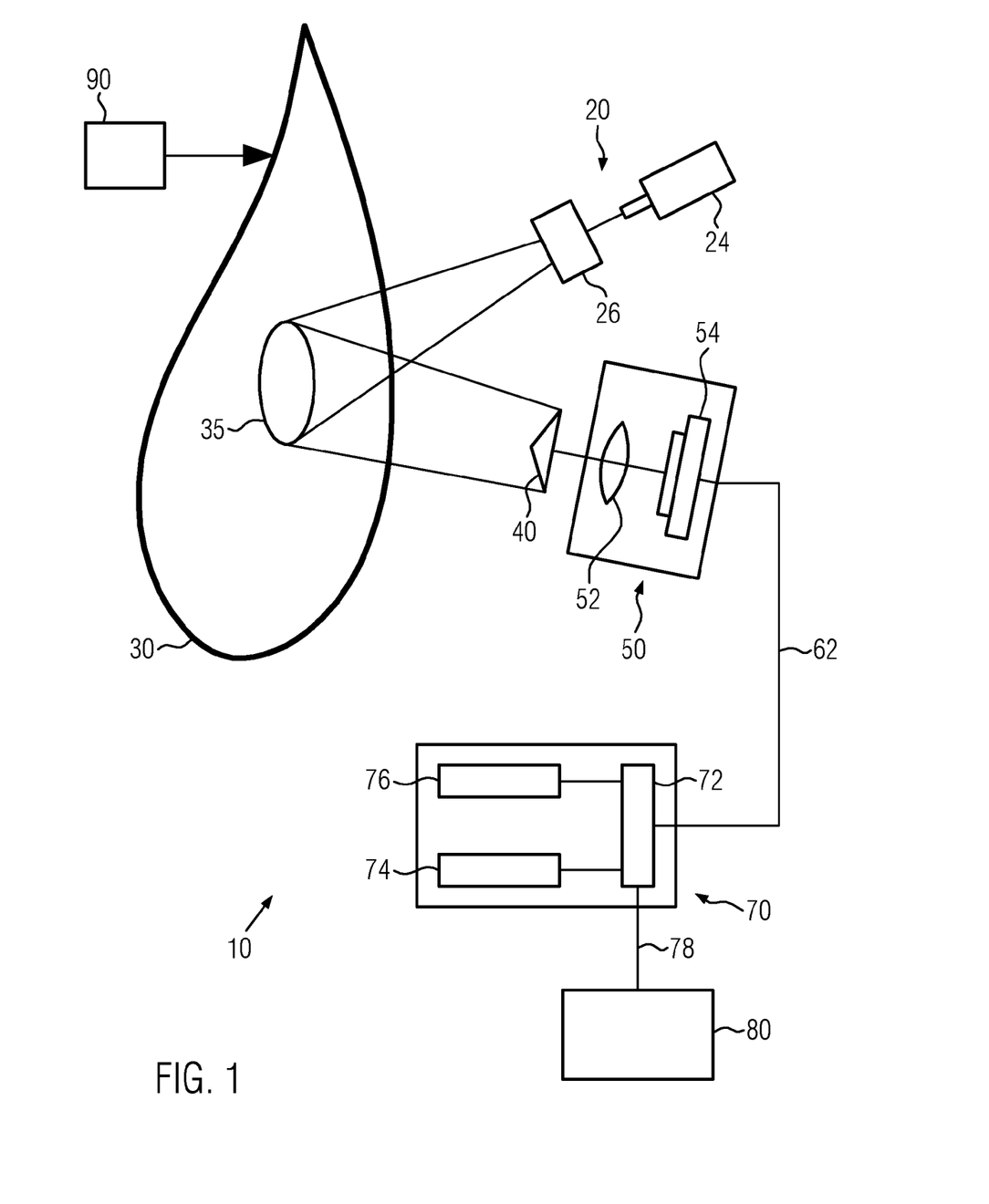
FIG. 1 schematically illustrates a schematic block diagram of a system in accordance with some illustrative embodiments of the present invention.

Referring now to FIG. 1, a schematic block diagram of a system 10 for performing a shearography method is depicted. A source 20 of coherent electromagnetic radiation is disposed such that at least a surface region 35 of an object 30 is exposed to the coherent electromagnetic radiation of the source 20.

Furthermore, an imaging device 50 is arranged in the system 10 so as to receive light emanated from the surface region 35. The system 10 further comprises a stress-inducing device 90 for applying strain to the object 30.

In illustrative embodiments, as shown in FIG. 1, the source 20 may comprise a laser 24 and a beam expander or illuminator 26 by means of which the laser light is supplied to at least the surface region 35 of the object 30.

Light emanating from the surface region 35, particular laser light reflected from the surface region 35, may be imaged via an imaging element 52 of the imaging device 50 onto an image detector 54 disposed in the image plane of the imaging element 52 as schematically illustrated in FIG. 1.

As shown in FIG. 1, laser light being imaged onto the image detector 54 by the imaging element 52 may be subjected to a shearing element 40 which is disposed upstream the imaging element 52 of the imaging device 50. Though, the illustration in FIG. 1 schematically illustrates a prism as an example of the shearing element 40, the person skilled in the art will appreciate that this does not pose any limitation on the present invention.

The imaging detector 54 may be coupled to a processing device 70 by means of a line 62. In some illustrative embodiments, the line 62 may be implemented by a signal line for transmitting electrical, electronic and/or optical signals from the imaging detector 54 to the processing device 70 in a wireless and/or non-wireless manner.

The processing device 70 may comprise a central processing unit (CPU) 72, one or more memory devices 74 and/or a comparator 76 configured to access at least one memory device for retrieving saved data and comparing retrieved saved data with data provided by the imaging detector 54. The processing device 70 may further comprise (not illustrated) one or more logical extractors implemented as hardware or software, a video card, a frame-grabber, video and/or image capture circuits. The CPU may be further coupled to a displaying device 80, such as a screen and the like, via a signal line 78 for wirelessly, or non-wirelessly, transmitting electrical, electronic and/or optical signals from the CPU 72 to the displaying device 80.

In operation, coherent electromagnetic radiation, in the following referred to as light, emanating from the beam expander 26 is reflected from the surface region 35. The reflected light is subjected to a shearing operation by the shearing element 40 such that two laterally-displaced images of the surface region 35 are imaged onto the image-detector 54 by means of the imaging element 52. In this way, an interference image of a sheared image with a reference image is obtained by the laterally-displaced images as discussed above, the interference pattern being detected by the image detector 54. The person skilled in the art will appreciate that one of the laterally displaced images may represent a speckle pattern of the surface region 35 acting as a reference image, while the other image may represent the laterally-displaced speckle pattern representing a sheared image.

In illustrative embodiments, a first interference image is taken of the surface region 35 in a first stressed condition imposed by the stress-inducing device 90, and a second interference image is taken with object 30 being in a second stressed condition imposed by the stress-inducing device 90. In comparing the second interference image in the second stressed condition with the first interference image in the first stressed condition, a first shearogram may be derived representing the slope of the surface deformation induced by the stress-inducing device 90. Accordingly, a second shearogram may be obtained by applying a third load or stress condition to the laminated object and obtaining a third interference image in the third stress condition. A comparison of the third shear image with one of the first interference image and the second interference image (depending on whether the first or the second interference image is considered as a reference) may provide a second shearogram. Accordingly, a plurality of shearograms may be obtained. It is noted that each shearogram represents the slope of the deformation present in the respective load or stress state relative to the referenced shearogram. In an explicit example herein, the unloaded state or condition may be considered as defining a reference state or condition relative to which the shearograms are determined.

Figure 2A:
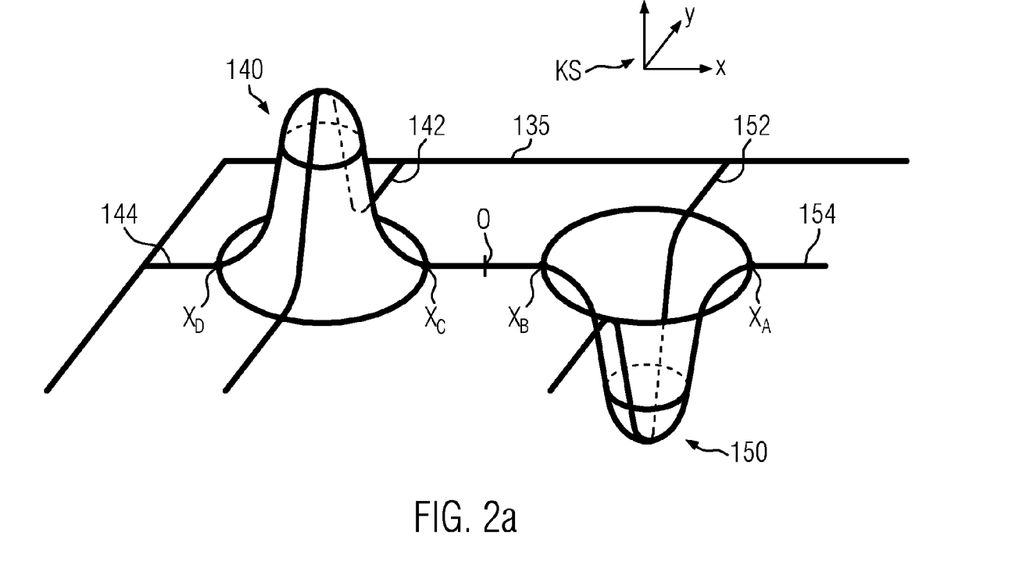
FIG. 2a schematically illustrates, in a perspective view, two types of defects in a surface of an object in accordance with an illustrative embodiment of the present invention.

FIG. 2a schematically illustrates a surface portion 135 of a surface of a laminated object, such as for example a surface portion of the surface region 35 of the laminated object 30 as shown in FIG. 1. FIG. 2a shows a bulge 140 and a depression 150 as being present in the illustrated surface portion 135.

The following discussion is performed with regard to a coordinate system KS in which perpendicularly oriented directions x and y are understood as to lie within the imaged plane corresponding to the surface region 135, while a z direction is to be taken as extending perpendicularly relative to x and y directions.

For ease of illustration, coordinate lines 142 and 144 are depicted with regard to the bulge 140, while coordinate lines 152 and 154 are illustrated with regard to the depression 150. As a result of the schematic illustration, the coordinate lines 144 and 154 are taken to be collinear. Furthermore, coordinate lines 144 and 154 are considered as representing an x-axis in the illustrated surface portion 135. Accordingly, coordinate lines 142 and 152 represent respective y-axes of respectively mapped local coordinate systems KS associated with the bulge 140 and the depression 150, respectively. The bulge 140 extends out of a plane corresponding to the surface portion 135 surrounding the bulge 140 along a z direction (parallel to the z-axis of the coordinate system KS) in an interval characterized by the points $x_D$ and $x_C$ along the coordinate line 144. Accordingly, the depression 150 is regarded as extending out of the plane corresponding to the surface region 135 surrounding the depression 150. Furthermore, the depression 150 is characterized by the interval $x_B$ to $x_A$ along the coordinate line 154. A reference point O is depicted in FIG. 2a as a point on the coordinate line extending between the bulge 140 and the depression 150 in alignment with the coordinate lines 144 and 154.

Figure 2B:
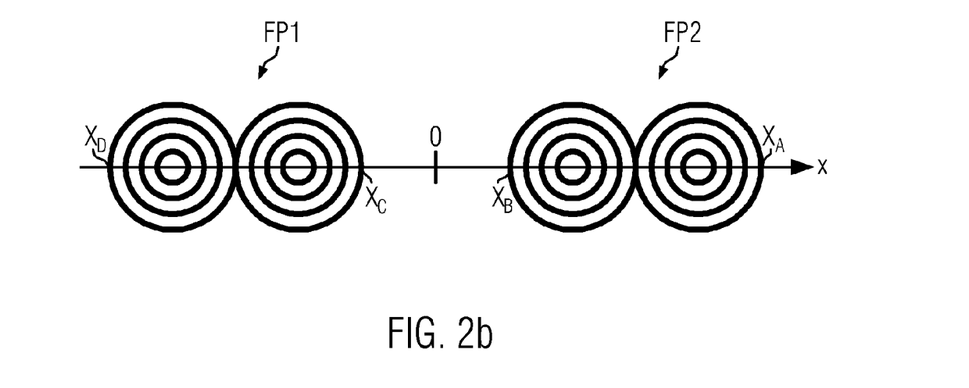

In the following, an illustrative embodiment will be described with regard to a shearing direction taken along the x-axis as defined by the coordinate system KS and represented by the coordinate lines 144 and 154. FIG. 2b illustrates fringing patterns or interference patterns in accordance with a shearogram as set out above. Particularly, a fringing pattern FP1 corresponds to the bulge 140, while a fringing pattern FP2 corresponds to the depression 150. It is noted that the symmetry of the bulge 140 and the depression 150 results in the special symmetries of the patterns FP1 and FP2 representing patterns of concentric circles.

In accordance with preceding explanations, the fringing patterns FP1 and FP2 actually correspond to the slope of the deformation, along the shearing direction, caused by an applied load or stress condition inferred by the stress-inducing device 90 in FIG. 1A when taken the unloaded state or condition as reference. The concentric circles in the fringing patterns FP1 and FP2 actually represent contour lines of a slope function of the bulge 140 and the depression 150 along the coordinate lines 144, 154 (c.f. FIG. 2a). Therefore, when illustrating the contour plots as a two-dimensional section along the z-axis in FIG. 2b versus the z-direction, i.e. perpendicular to the illustrated paper plane in FIG. 2b, the diagram in FIG. 2c is obtained.

Figure 2C:
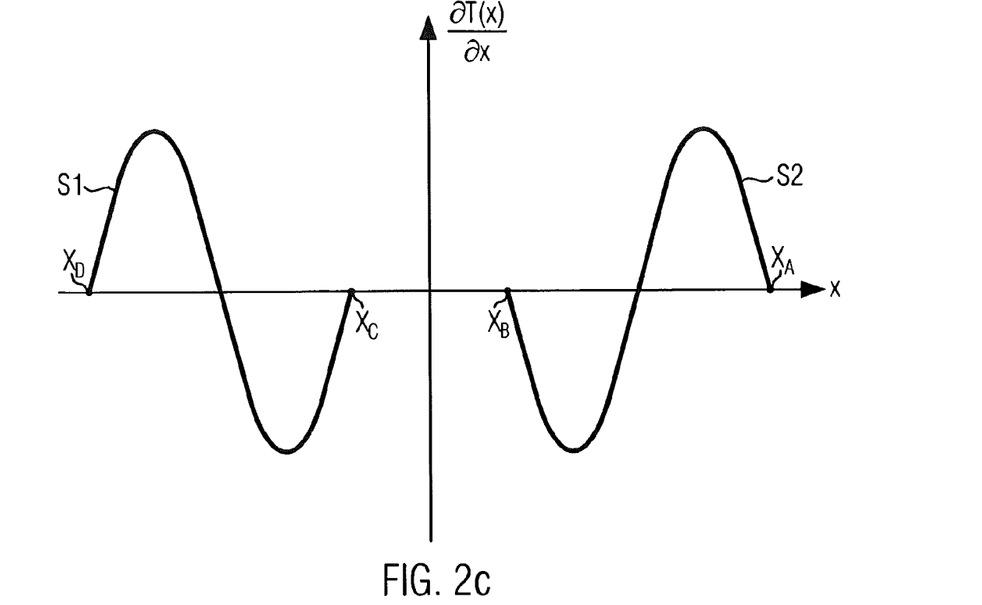
FIG. 2c schematically illustrates a slope diagram of the defects as illustrated in FIG. 2a, associated to the fringe pattern in FIG. 2b.

FIG. 2c illustrates the slope of the bulge 140 and the depression 150 taken along the coordinate lines 144 and 154 and, particularly, along the x-direction which is identical to the shearing direction. The person skilled in the art will understand that the slope represents the first derivative of the topography of the surface 135 (c.f. FIG. 2a) along a line in the surface 135 in FIG. 2a. In the following, the topography along the x direction, i.e. along the coordinate lines 144, 154 in FIG. 2a, will be represented by a function T(x) and the slope illustrated in FIG. 2c is the first derivative of T(x) along the x direction in the surface 135 in FIG. 2a. Particularly, a curve S1 represents the slope of the bulge 140 in the interval $x_C$ to $x_D$, while a curve S2 represents the depression in the interval $x_B$ to $x_A$. For instance, the slope of the curve S1 is positive when starting from $x_D$ moving along the coordinate line 144 in FIG. 2A to the right. At the peak of the bulge 140 in FIG. 2A, the curve S1 assumes 0 slope, while further continuing to the right in FIG. 2A, the slope becomes negative. An according discussion applies to the curve S2 with regard to the depression 150.

Figure 2D:
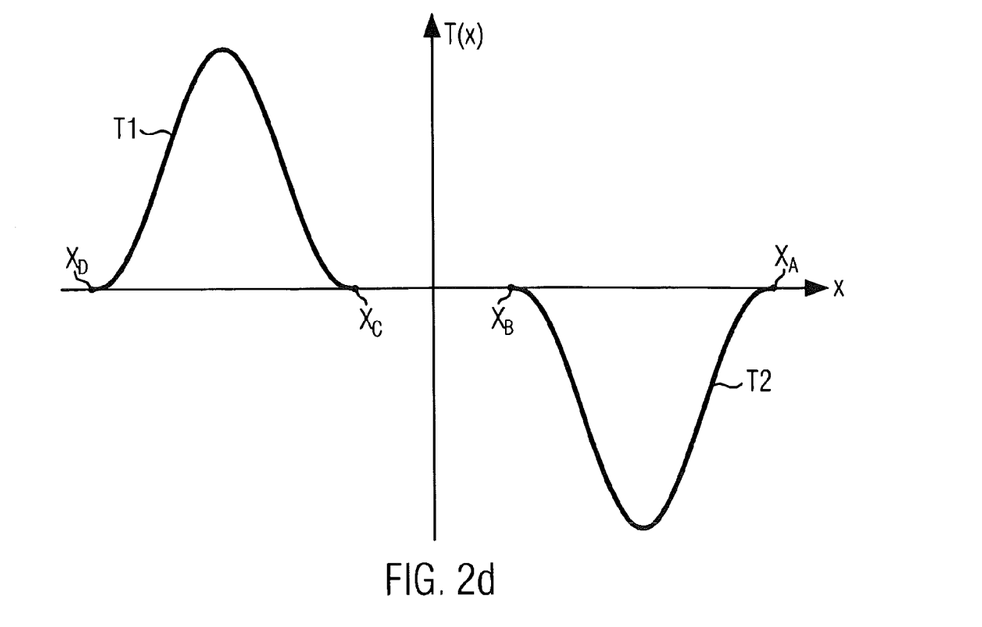
FIG. 2d schematically illustrates the topographical diagram of the defects as illustrated in FIG. 2a along the x direction.

Upon integrating the slope of T(x) along the x direction, i.e. the tracks S1 and S2, respectively, curves T1 and T2, respectively, are obtained as illustrated in FIG. 2d. Herein, the curves T1 and T2 represent the course of the surface topography taken along the coordinate lines 144 and 154 in FIG. 2a. Particularly, the curve T1 corresponds to a section of the bulge 140 with a plane defined in FIG. 2a by the coordinate line 144 and the z direction. The origin of the diagram illustrated in FIG. 2d corresponds to the reference point O in FIG. 2a.

Figure 2E:
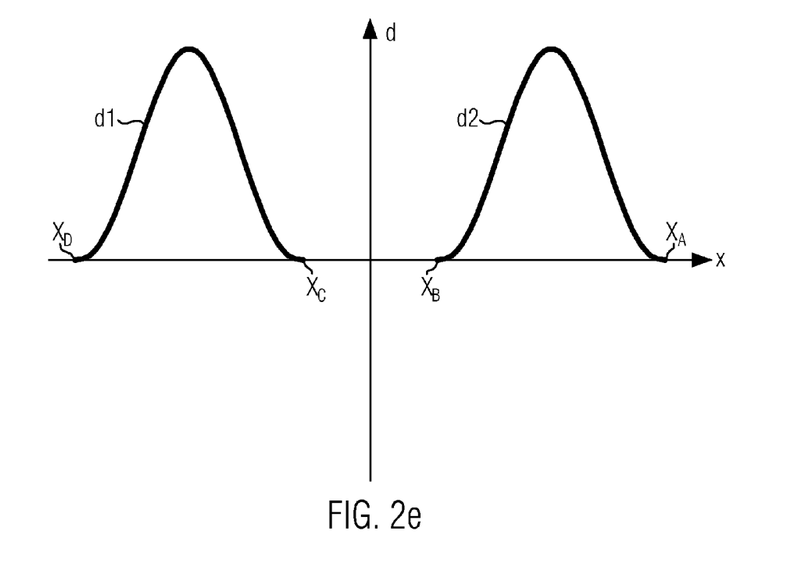
FIG. 2e schematically illustrates a diagram of absolute displacement associated with FIG. 2d.

FIG. 2e illustrates the absolute displacement or absolute value of deformation d obtained by applying the absolute value to the curves T1 and T2 as illustrated in FIG. 2d. Herein, a curve d1 corresponds to the absolute value of the curve T1, while a curve d2 corresponds to the absolute value of the curve T2. As illustrated in FIG. 2e, the absolute displacement d represents the magnitude of displacement imposed by deformation in a loaded state relative to the surface in the unloaded state. Particularly, the absolute displacement d may be considered as representing further processed topographical data obtained from the topography represented in FIG. 2d.

By means of FIGS. 3a to 3h, measurements performed by the inventors are illustrated and will be described in the following with regard to further illustrative embodiments of the present invention.

Figures 3A, 3B:
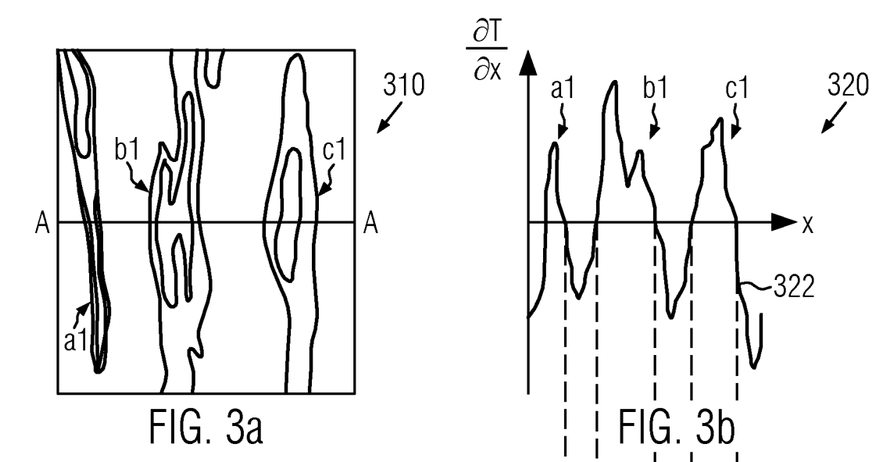
FIGS. 3a, 3c, 3e and 3g, respectively, schematically illustrate respective contour diagrams of slope, topography, displacement and energy, obtained by shearography measurements in accordance with an illustrative embodiment of the present invention.
FIGS. 3b, 3d, 3f and 3h, respectively, schematically illustrate diagrams of slope, topography, displacement and energy, associated with the respective contour diagrams of FIGS. 3a, 3c, 3e, 3g along one direction.

The contour diagram shown in FIG. 3a represents a shearogram of a wind turbine blade when subjected to a shearography measurement. Reference numerals a1, b1 and c1 denote contour lines in the shearogram 310 that potentially indicate anomalous surface deformations.

FIG. 3b shows a diagram of the shearogram 310 taken along the line AA in FIG. 3a. Particularly, a curve 322 of the diagram 320 indicates the slope of the deformations generated in the surface region under measurement (c.f. discussion of FIGS. 2a to 2e). As visible from the course of curve 322 in FIG. 3b, the contour region denoted by a1 may be considered as representing a bulging portion relative to its surrounding surface. Similarly, the contour portion denoted by b1 and the contour portion denoted by c1 may be considered as equally attributing to bulging regions relative to their surrounding surface.

Figure 3C:
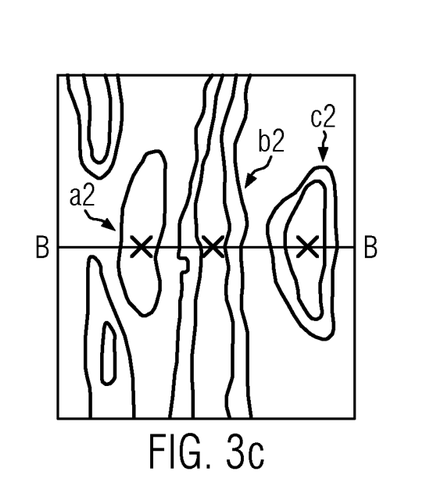
Figure 3D:
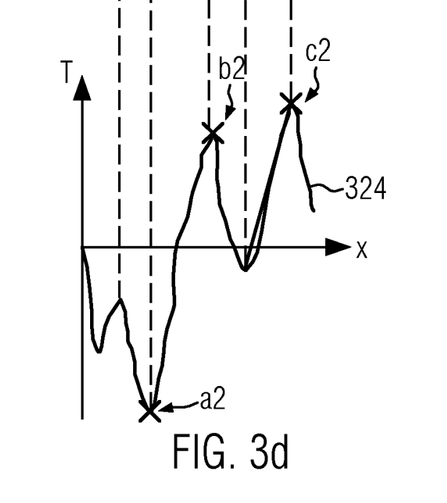

FIG. 3c illustrates a contour diagram relating to the topography of the surface obtained by integrating the slope derived from the shearogram 310. Contour regions a2, b2 and c2 obtained from the corresponding to contour regions a1, b1 and c1 in FIG. 3A by integration are indicated in FIG. 3c. FIG. 3d shows a diagram representing the topography of the contour diagram taken along the line BB in FIG. 3c.

Herein, a curve 324 may be considered as representing the course of the topography taken along a direction corresponding to the line BB in FIG. 3c. As visible from the course of the curve 324, the contour region a2 in FIG. 3c, represents a relatively deep depression. On the other hand, the contour regions b2 and c2, as indicated in FIG. 3c, represent bulges in the surface under measurement.

Figure 3E:
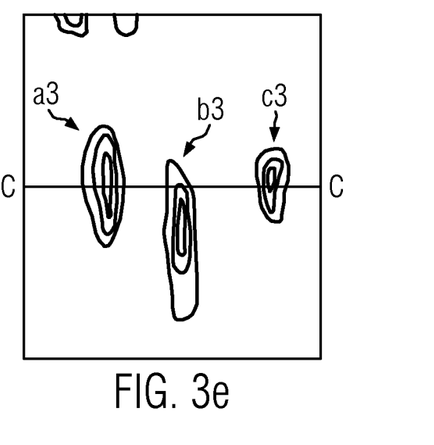

In applying further processing to the topographical data as represented in the FIGS. 3c and 3d by applying an absolute value to the topographical data for obtaining further processed topographical data relating to absolute displacement indicating a measure for the absolute deformation caused by a load. Therefore, FIG. 3e schematically illustrates the corresponding contour diagram obtained by taking the absolute value from the topographical data. Contour regions a3, b3 and c3 denote surface regions corresponding to according contour regions a2, b2 and c2 in FIG. 3c.

Figure 3F:
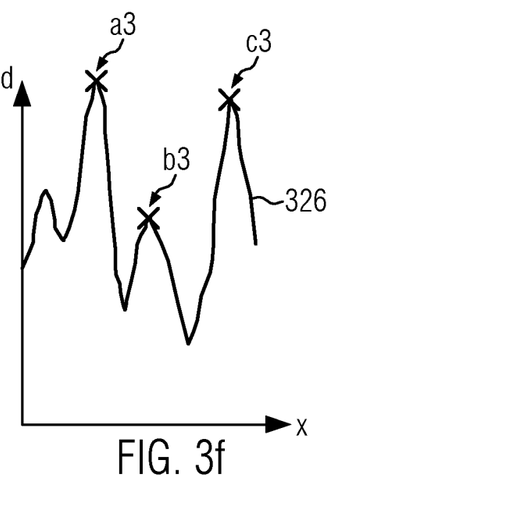

FIG. 3f illustrates a diagram of the contour diagram in FIG. 3e taken along the line CC in FIG. 3e. Particularly, a curve 326 in FIG. 3f represents the absolute displacement or deformation in the surface along the line CC in FIG. 3e. As is visible from FIG. 3f, the highest peak, denoted a3, of the curve 326 represents the center point of contour region.

Furthermore, the peak denoted by c3 in the curve of FIG. 3f corresponds to the contour region c3 in FIG. 3e, indicating the bulge c2 in FIG. 3c.

A possible way of further processing topographical data, alternatively or additionally, may be obtained by applying a square operation to the topographical data resulting in data relating to (topographical data)$^2$. The inventors understood that data relating to (topographical data)$^2$ provides a measure for the energy, e.g. related to deforming the surface in accordance with the absolute displacement or deformation derived from the topography. Herein, the squaring operation is attributed to understanding the deformations in the surface as representing elastic deformations of the surface and therefore satisfying Hooke's law. However, the person skilled in the art will appreciate that non-elastic contributions may lead to deviations from Hooke's law and, therefore, from the pure square relation between energy and deformation. Alternatively, further processing of the topographical data may be performed with regard to (topographical data)$^q$, wherein q is a rational number >1. For example, q can be in a range from 1.6 to 2.5 or in a range from 1.8 to 2.2. However, depending on the severity of non-elasticity, as particularly present in defective material, stronger deviation from the exponent of 2 may be taken into consideration, such as q greater 2, or q equal or greater 3, or q smaller 2, or q smaller 1.6.

Figure 3G:
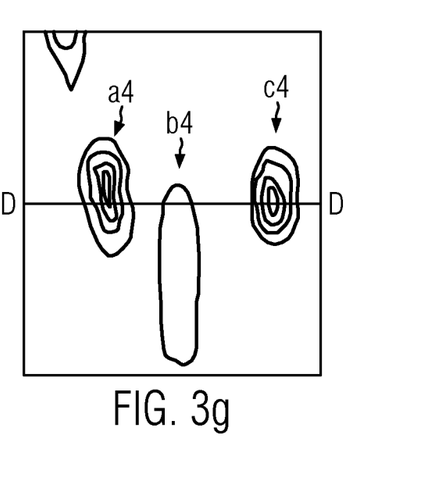

FIG. 3g shows a contour diagram obtained by further processing of the topographical data illustrated in FIG. 3b by applying a square operation to the topographical data. Reference numerals a4, b4 and c4 denote contour regions corresponding to respective contour regions a2, b2 and c2 in FIG. 3b. Particularly, contour regions a4 and c4 appear to be of great relevance because the density of the contour lines within the contour regions a4 and c4 is high in comparison with the surrounding surface and particularly relative to the contour region b4.

Figure 3H:
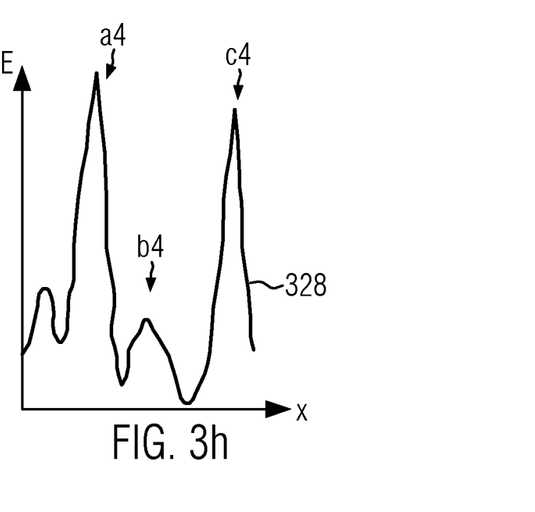

FIG. 3h illustrates a diagram of the contour diagram in FIG. 3g taken along the line DD in FIG. 3g. A curve 328 in FIG. 3h represents the course of energy associated with the deformation of the surface along the line DD in FIG. 3g. Particularly, peaks a4 and c4 corresponding to contour regions a4 and c4 in FIG. 3g indicate very high deformation energy attributed to the deformations present within the contour regions a4 and c4. In comparison, the contour region b4 in FIG. 3g is associated with relative low deformation energy. From FIG. 3h it may therefore be concluded that contour regions a4 and c4 showing a considerably high deformation energy behaviour indicated by peaks a4 and c4 in FIG. 3h actually identify a critical characteristic of the surface under low-applied load or stress. It is emphasized that an according conclusion is not unambiguously derivable by FIGS. 3a and 3c and/or FIGS. 3b and 3d alone. Furthermore, FIGS. 3a to 3d suggesting respective contour regions b1 and b2 as relevant therefore lead to a false positive. By contrast, FIGS. 3e to 3g allow for an easy and fast identification of defects in the surface, namely a4 and c4 in the illustrated examples.

In some illustrative embodiments of the present invention, a database may be provided having further processed data, such as data relating to absolute displacement/deformation and energy data and/or absolute displacement/deformation data correlated with respectively applied load and/or energy data correlated with respectively-applied load. Additionally or alternatively, further processed data assigned to known defects and/or correlated with information regarding the severity of the respectively identified defects may be further provided by the data base.

In operation, a measured shearogram may be processed to obtain topographical data associated with the shearogram. The obtained topographical data may be, in a next step, further processed to provide further processed topographical data, such as absolute displacement/deformation data, energy-related data, energy-related load data in which energy data is correlated with applied load, this absolute displacement/deformation-load data in which absolute displacement/deformation data is correlated with applied load data and severity-defect data in which at least one of absolute displacement/deformation data and energy data of known and/or previously-identified defects is correlated with information indicating the severity of the defect, for identifying at least one of a type, severity and position of a defect. The person skilled in the art will appreciate that, herein, further evaluation techniques may be applied, such as applying Fourier transformations to saved and/or obtained data for comparing Fourier signatures in order to match measured data to data present in the data base, such as space frequencies and the like. Additionally or alternatively, the further processed data may be further processed by applying filters to increase signal to noise ratio and/or to suppress noise.

In some special illustrative example, topographical data may be further processed by taking the absolute value of the topographical data to obtain absolute displacement data. Alternatively, the topographical data may be subjected to a squaring operation to obtain energy data. Alternatively, absolute displacement data may be subjected to a squaring operation. In general, energy related data may be obtained by taking the one of topographical data and absolute displacement data to the power of q, q being a rational number greater one as described above. Additionally or alternatively, severity-defect data may be produced in which at least one of absolute displacement data and energy data of known and/or previously-identified defects is correlated with information indicating the severity of the defect, for identifying at least one of a type, severity and position of a defect.

In a further illustrative example of operation and data processing, at least two, preferably all of the four sets of data including the shearogram, the topographical data, the absolute displacement data, and energy data, possibly one or each further enhanced by the above described filtering or Fourier transformation processing, are considered together and in differentiation from each other to analyse measurement results and provide improved defect detection capability. In particular, when using all four sets of data, the data from one set can be used to interpret or complement data of another, for instance the respective next higher level set of data, to thereby overcome potential ambiguities in data interpretation.

In some further illustrative examples, absolute displacement data and/or energy related data may be correlated with the applied load to obtain energy-related load data.

Alternatively or additionally, further processing of the topographical data may comprise specifying a partition of a measuring field illuminated by electromagnetic radiation on a surface under examination by defining n regions, n>1, within the measuring field such that the measuring field is covered by the union of the n regions, the union of the n regions may be thought of as representing a tessellation of the measuring field, with possibly, but not necessarily, the n regions overlapping each other. Subsequently, the further processed topographical data (absolute displacement/deformation data and/or (topographical data)$^2$ data) may be summed up in each region such that n integration values are obtained, each integration value being attributed to a respective region of the n regions.

In an illustrative example, the n regions may be chosen in association of pixels of a detecting device (e.g. a CCD or the like) such that each region of the n regions may be associated to one or more pixels of the detecting device. In this way, each region may represent one or more values obtained by one or more pixels. In summing up measuring values associated to the pixels, numerical integration of the measuring values in the measuring field may be performed. The person skilled in the art will appreciate that line integrals instead of area integrals may be accordingly obtained, for example, by choosing a tessellation of a line and summing up measuring values along the line. For example, a line may be represented by a subset of regions of the tessellation covering or approximating the line.

The person skilled in the art will appreciate that summation may be performed by applying a weighting function to each region before summing up, the weighting function taking effects into account such as errors in optical systems (e.g. lens aberration etc), characteristics of the material under examination (e.g. thermal characteristics when thermal stress inducing mechanisms are applied, deviations from Hooke's law due to inelasticity etc) and the like. In selecting sub-partitions of the partition in n regions by simply taking an average of a region with its directly adjacent regions, a coarsening of the set of integration data may be obtained which may be understood as "zooming out" from the measuring field. For example, an averaged integration value may be obtained by forming a weighted average value of a region within a certain neighborhood of the region, wherein a region of the neighborhood may be weighted in accordance with a predetermined weight function (e.g. a constant function, a statistical measure, a distance depending function and the like). In this way, an averaged integration value may be assigned to each region for obtaining a set of averaged integration values or only to a certain subset of regions of the set of n regions for obtaining a coarse set of averaged integration values.

Figure 4:
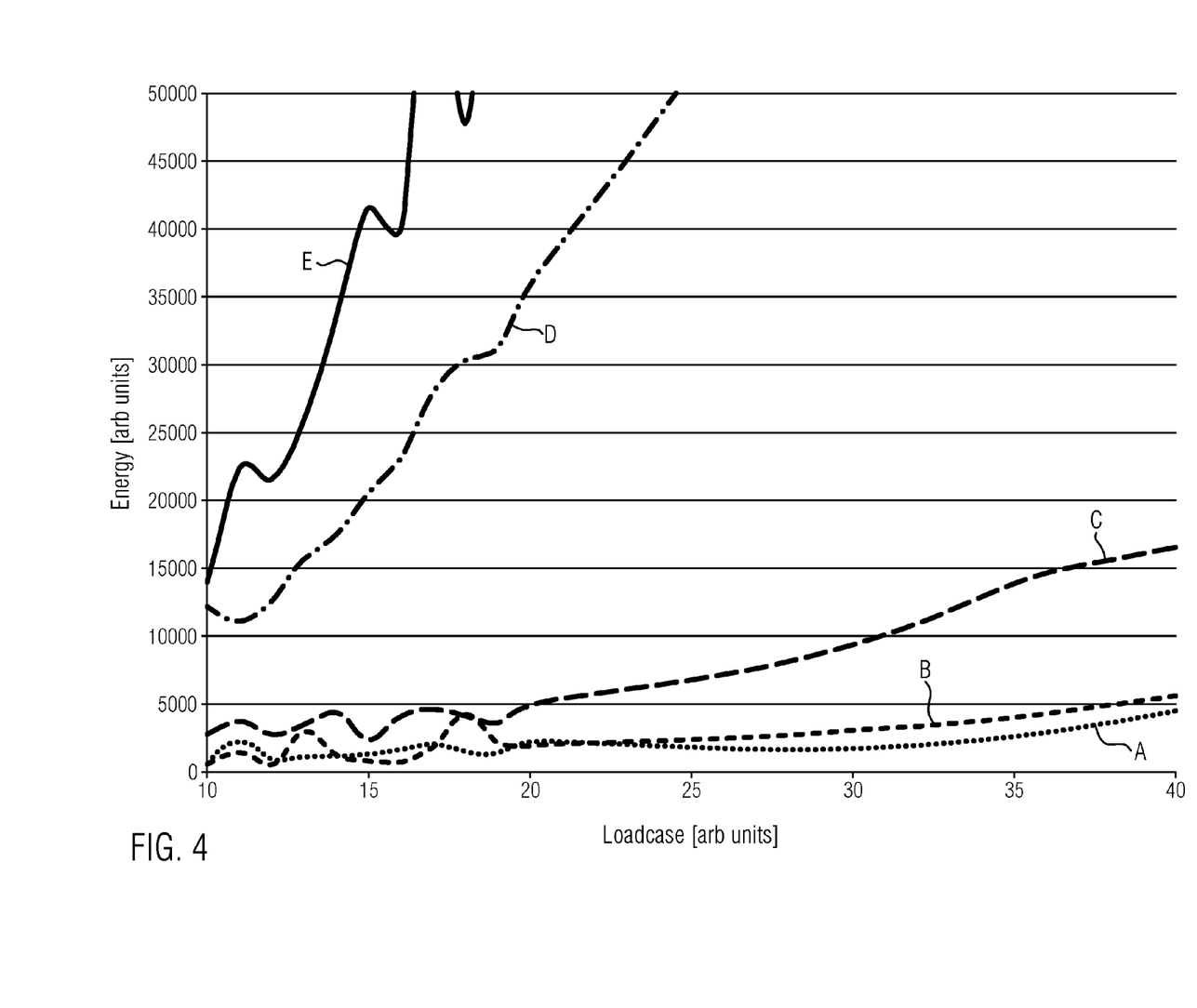
FIG. 4 schematically illustrates a diagram representing energy versus load case relations in accordance with some illustrative embodiments of the present invention.

FIG. 4 illustrates an illustrative measurement provided by the inventors in which energy-load data is shown. Particularly, FIG. 4 depicts a graphical relation between energy and the respectively-applied load case to the laminated object in kilograms. The energy as plotted on the ordinate may be obtained by numerically calculating an energy value by integrating energy data along a direction within the shearogram or in a certain surface region of the shearogram as described above. Herein, curves A, B, C, D, and E represent energy values obtained by integrating energy values along different box sections in a measuring box of a surface region under examination. In comparing each of the curves A, B, C, D and E to energy-load data of a data base it is possible to identify defects present in the box section. For example, the curve C resembles data indicating a laminate wrinkle defect, whereas curve D represents kinked laminate defect. Going further curve E represents a both kinked and delaminated defect. Finally, in similar ways, the curves A and B may be characterized as providing a normal behaviour. Therefore, it is possible to reliably and quickly identify the type and severity of a defect. As visible in connection with FIGS. 3a to 3g, it is further possible to locate defects.

In summary, the present invention relates to a method of analyzing a laminated object and to a system for analyzing a laminated object. Illustrative embodiments herein relate to optical interferometry techniques for non-destructively analyzing laminated objects with large surface utilized to obtain data relating to the topography of an object under examination and to further process the obtained topographical data so as to identify type and/or severity and/or position of surface defects. Exemplary optical interferometry techniques may comprise shearography, holographical methods or other techniques involving optical interferometry.

The invention claimed is:

1. A method of analyzing a laminated object, comprising:
exposing a surface area of the laminated object to a coherent electromagnetic radiation;
detecting an interference pattern induced by the coherent electromagnetic radiation reflected by the surface area;
determining topographical data of the surface area based on the interference pattern; and
further processing the topographical data by taking the absolute value of the topographical data to obtain absolute displacement data and raising the absolute displacement data to the power of q, wherein q is a rational number and q>1, or
subjecting the topographical data to a squaring operation to obtain energy data.

2. The method of claim 1, further comprising applying different load states to the laminated object for determining further processed topographical data at the different load states and obtaining load data relating the further processed topographical data to the applied load.

3. The method of claim 2, wherein further processing comprises integrating the further processed topographical data at the different load states along a curve on the surface area for obtaining integration data related to the applied load.

4. The method of claim 3, further comprising identifying surface defects based on comparing the load data or integration data with a data base comprising known load data or integration data assigned to known surface defects.

5. The method of claim 1, further comprising displaying at least the further processed topographical data to a user.

6. The method of claim 1, further comprising filtering at least the further processed topographical data in accordance with a predetermined filter to increase signal to noise ratio and/or to suppress noise.

7. The method of claim 1, further comprising identifying a position of a surface defect based on at least the further processed topographical data.

8. The method of claim 1, wherein the laminated object is a wind turbine blade of a wind power installation and q is out of a range from 1.6 to 2.5.

9. The method of claim 1, wherein further processing the topographical data comprises defining n regions, n>1, covering the surface area such that the union of the regions comprises the surface area and summing in each region the further processed topographical data to obtain n integration values.

10. The method of claim 1, further comprising obtaining at least two data sets, and complementing data of one data set with data obtained from another data set, the data sets each being provided by one of said steps of detecting an interference pattern, determining topographical data, taking the absolute value of the topographical data, and raising the topographical data to the power of q.

11. The method of claim 1, wherein further processing the topographical data comprises displaying the four sets of data including the interference pattern, the topographical data, the absolute values of the topographical data and the topographical data raised to the power of q, preferably with q=2, enabling evaluation of the measurement data by complementing data of one set with information obtained from another set.

12. A system for analyzing a laminated object, comprising:
a source of electromagnetic radiation providing measuring radiation and reference radiation;
a detector configured to detect the electromagnetic radiation and to provide data; and
a processor configured to process data provided by the detector and to determine topological data based on the provided data and to further process the topographical data by taking the absolute value of the topographical data to obtain absolute displacement data and raising the absolute displacement data to the power of q, q being a rational number and q>1, or
subjecting the topographical data to a squaring operation to obtain energy data.

13. The system of claim 12, further comprising a memory device comprising a database of data for various types of surface defects, the data relating values of applied load to at least one of absolute values of topographical data values of topographical data to the power of q.

14. The system of claim 13, further comprising a comparator configured to compare data processed by the processor with data of the data base.

15. The system of claim 13, wherein the memory device comprising data indicating a severity of various kinds of surface defects associated to respective values of applied load.

16. The system of claim 12, further comprising a shearing element configured to generate a sheared image at the detector.

* * * * *